United States Patent
Ishibashi et al.

(10) Patent No.: US 8,245,929 B2
(45) Date of Patent: Aug. 21, 2012

(54) INFORMATION PROCESSING DEVICE, WITH A CONTROL UNIT TO CONTROL SUPPLY OF LIGHT TO AN IC CARD WHEN COMMUNICATING DATA TO THE IC CARD

(75) Inventors: Yoshihito Ishibashi, Tokyo (JP); Mamoru Suzuki, Kanagawa (JP)

(73) Assignee: Sony Corporation, Tokyo (JP)

(*) Notice: Subject to any disclaimer, the term of this patent is extended or adjusted under 35 U.S.C. 154(b) by 301 days.

(21) Appl. No.: 12/581,395

(22) Filed: Oct. 19, 2009

(65) Prior Publication Data
US 2010/0140353 A1    Jun. 10, 2010

(30) Foreign Application Priority Data
Dec. 10, 2008 (JP) ................... 2008-314798

(51) Int. Cl.
*G06K 7/00* (2006.01)
*G06K 7/08* (2006.01)
*G06K 7/10* (2006.01)
*G06K 7/14* (2006.01)
(52) U.S. Cl. ......... 235/440; 235/451; 235/454; 235/455
(58) Field of Classification Search .......... 235/439, 235/440, 451, 454, 455
See application file for complete search history.

(56) References Cited

U.S. PATENT DOCUMENTS

| 5,700,096 A * | 12/1997 | Satoh et al. ............. 400/225 |
| 2007/0040683 A1* | 2/2007 | Oliver et al. ............. 340/572.1 |
| 2010/0176202 A1* | 7/2010 | Teraoka et al. ............. 235/492 |

FOREIGN PATENT DOCUMENTS

| JP | 2003-208582 | 7/2003 |
| JP | 2005078370 A * | 3/2005 |
| JP | 2008-21176 | 1/2008 |

OTHER PUBLICATIONS

U.S. Appl. No. 12/613,668, filed Nov. 6, 2009, Ishibashi, et al.

* cited by examiner

*Primary Examiner* — Thien M. Le
*Assistant Examiner* — Toan Ly
(74) *Attorney, Agent, or Firm* — Oblon, Spivak, McClelland, Maier & Neustadt, L.L.P.

(57) ABSTRACT

There is provided an information processing device comprising: a light emitting unit to supply light to a power generating means mounted on an IC card with a display function and generating a power by photoelectric conversion; a communication unit to transmit and receive data to and from the IC card; and a control unit to stop supply of light by the light emitting unit during communication with the IC card by the communication unit and stop communication by the communication unit during supply of light by the light emitting unit.

8 Claims, 12 Drawing Sheets

| ADDRESS | DATA ITEM |
|---|---|
| : | : |
| X0 | |
| : | DISPLAY REQUEST DATA |
| X5 | |
| X6 | RESPONSE CONTROL DATA |
| : | : |
| Y0 | |
| : | APPLICATION DATA 1 |
| Y5 | |
| : | : |
| Z0 | |
| : | APPLICATION DATA M |
| Z5 | |
| : | : |

56

| ADDRESS | DATA ITEM |
|---|---|
| 01 | CARD IDENTIFIER |
| 02 | DISPLAY CONTROL DATA |
| 03 | DISPLAY SEQUENCE TABLE |
| : | : |
| K0 : K5 | DISPLAY DATA 1 |
| : | : |
| PA : PF | DISPLAY DATA N |

| LIGHT EMITTING PATTERN | STATE PER LIGHT EMITTING SECTION | | | OPERATION OF IC CARD |
|---|---|---|---|---|
| | FIRST | SECOND | THIRD | |
| A | ON | ON | ON | DISPLAY |
| B | OFF | ON | ON | DISPLAY SWITCH (NEXT) |
| C | ON | ON | OFF | DISPLAY SWITCH (BACK) |
| D | OFF | OFF | OFF | NO DISPLAY |

United States Patent US 8,245,929 B2

INFORMATION PROCESSING DEVICE, WITH A CONTROL UNIT TO CONTROL SUPPLY OF LIGHT TO AN IC CARD WHEN COMMUNICATING DATA TO THE IC CARD

BACKGROUND OF THE INVENTION

1. Field of the Invention

The present invention relates to an information processing device, a communication control method and a program.

2. Description of the Related Art

IC cards are widely used today that are capable of recording a large volume of information by incorporating semiconductor memory such as RAM, ROM or EEPROM. Various kinds of information such as balance information for electronic payments, electronic ticket information for transportation or amusement facilities, or coupon information used for shopping, for example, are written to IC cards through a reader/writer.

Instances of technological development for enhancing the convenience of IC cards are as follows. An IC card according to Japanese Unexamined Patent Application Publication No. 2003-208582, for example, is capable of displaying recorded information for a user by a display device such as an electronic paper or an LCD panel mounted on the card surface. Further, an IC card according to Japanese Unexamined Patent Application Publication No. 2008-21176, for example, is capable of displaying information on a display device even at a distance from a reader/writer with use of a power generated by photoelectric conversion such as a solar battery.

SUMMARY OF THE INVENTION

However, in order to add a display function to an IC card, it is necessary to incorporate a circuit for driving a display device onto an IC that controls the general functions of the IC card. The development costs of an LSI that is used in an IC card are high, and the development period is often long due to a high demand for security. In order to prevent such adverse effects, it is effective to mount a display CPU that drives a display device in addition to an IC card CPU, so that the display CPU reads data from the IC card CPU and displays the read information. In this case, however, there is a concern for the collision of signals when the display CPU accesses the IC card CPU while a reader/writer is communicating with the IC card, which causes defects such as processing error or data inconsistency to occur in the IC card.

In light of the foregoing, it is desirable to provide a novel and improved information processing device, communication control method and program capable of preventing the collision of signals when communicating with an IC card including a display device.

According to an embodiment of the present invention, there is provided an information processing device comprising a light emitting unit to supply light to a power generating means mounted on an IC card with a display function and generating a power by photoelectric conversion, a communication unit to transmit and receive data to and from the IC card and a control unit to stop supply of light by the light emitting unit during communication with the IC card by the communication unit and stop communication by the communication unit during supply of light by the light emitting unit.

When communication with the IC card ends, the control unit may start supply of light by the light emitting unit after stopping signal transmission from the communication unit.

The control unit may restart communication by the communication unit after lapse of a predetermined waiting time from start or stop of supply of light by the light emitting unit.

The information processing device may further comprise an imaging unit capable of imaging display contents displayed on the IC card and an image processing unit to determine whether the data recorded on the IC card is captured into the display function of the IC card or not based on an image imaged by the imaging unit, wherein the control unit restarts communication by the communication unit if the image processing unit determines that the data is captured into the display function of the IC card after starting supply of light by the light emitting unit.

The information processing device may further comprise an IC card holding unit to hold the IC card at a position where light can be supplied from the light emitting unit to the power generating means of the IC card and a display unit of the IC card is visible from outside.

The information processing device may further comprise an imaging unit capable of imaging display contents displayed on the IC card and an image processing unit to determine whether writing of the data to the IC card succeeds or not by verifying an image imaged by the imaging unit against the data recorded on the IC card.

According to another embodiment of the present invention, there is provided a communication control method in an information processing device including a light emitting unit to supply light to a power generating means mounted on an IC card with a display function and generating a power by photoelectric conversion, and a communication unit to transmit and receive data to and from the IC card, the method comprising the steps of stopping supply of light by the light emitting unit, performing data communication with the IC card by the communication unit, stopping communication by the communication unit and starting supply of light by the light emitting unit.

According to another embodiment of the present invention, there is provided a program causing a computer controlling an information processing device including a light emitting unit to supply light to a power generating means mounted on an IC card with a display function and generating a power by photoelectric conversion to implement functions comprising a communication unit to transmit and receive data to and from the IC card and a control unit to stop supply of light by the light emitting unit during communication with the IC card by the communication unit and stop communication by the communication unit during supply of light by the light emitting unit.

According to the embodiments of the present invention described above, it is possible to provide the information processing device, communication control method and program capable of preventing the collision of signals when communicating with an IC card including a display device.

DETAILED DESCRIPTION OF THE EMBODIMENT(S)

Figure 1:
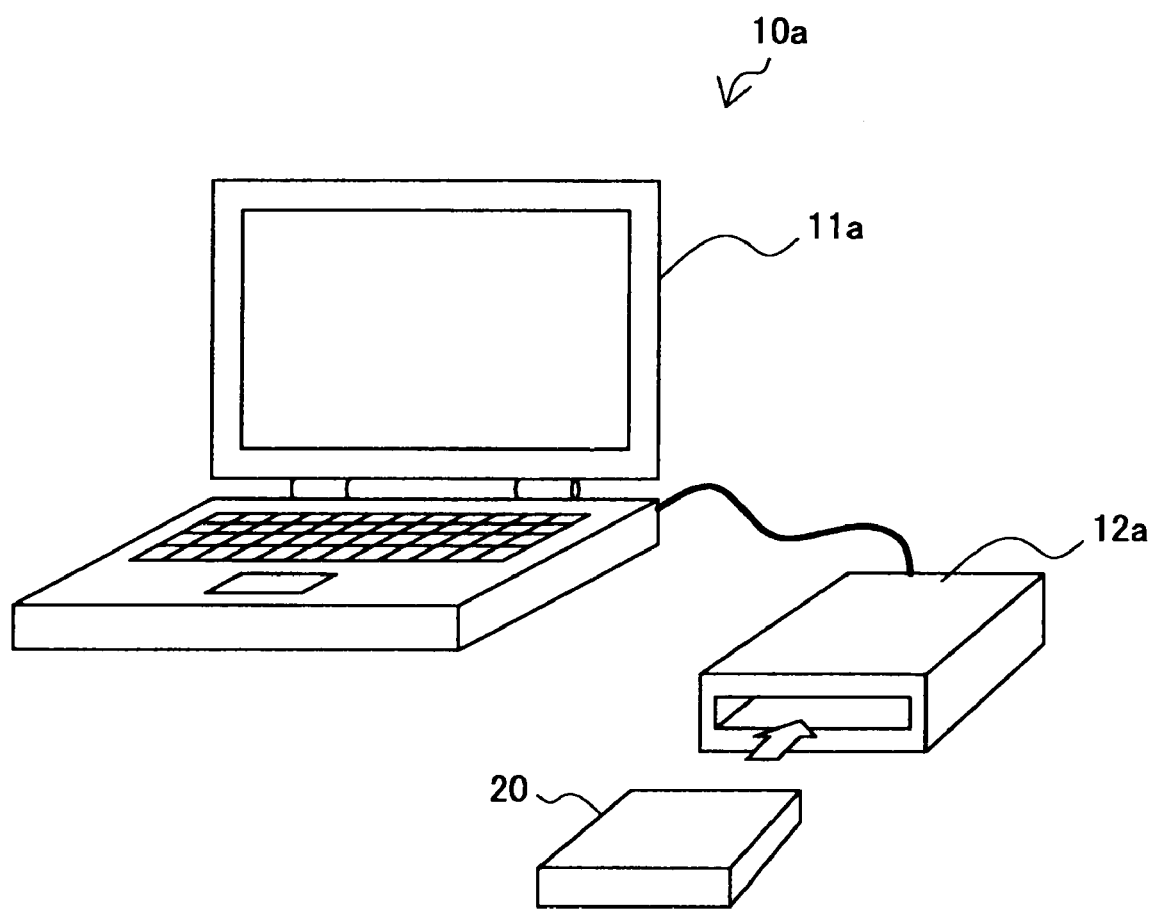
FIG. 1 is a schematic view showing an example of an information processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described hereinafter in the following order.

1. Outline of Information Processing Device According to Embodiment
2. Explanation of IC Card Related to the Present Invention
  2-1. Appearance of IC Card
  2-2. Internal Configuration of IC Card
  2-3. Exemplary Data Structure
  2-4. Display Processing by IC Card
3. Configuration of Information Processing Device According to Embodiment
  3-1. Light Emitting Unit
  3-2. Light Emission Adjusting Unit
  3-3. Modulation/Demodulation Unit, Wireless Communication Unit and Antenna
  3-4. Control Unit
4. Flow of Writing Control Processing According to Embodiment
5. Explanation of Alternative Example
6. Summary

1. Outline of Information Processing Device According to Embodiment

An outline of an information processing device 10 according to an embodiment of the present invention is described hereinafter with reference to FIGS. 1 and 2.

Figure 2:
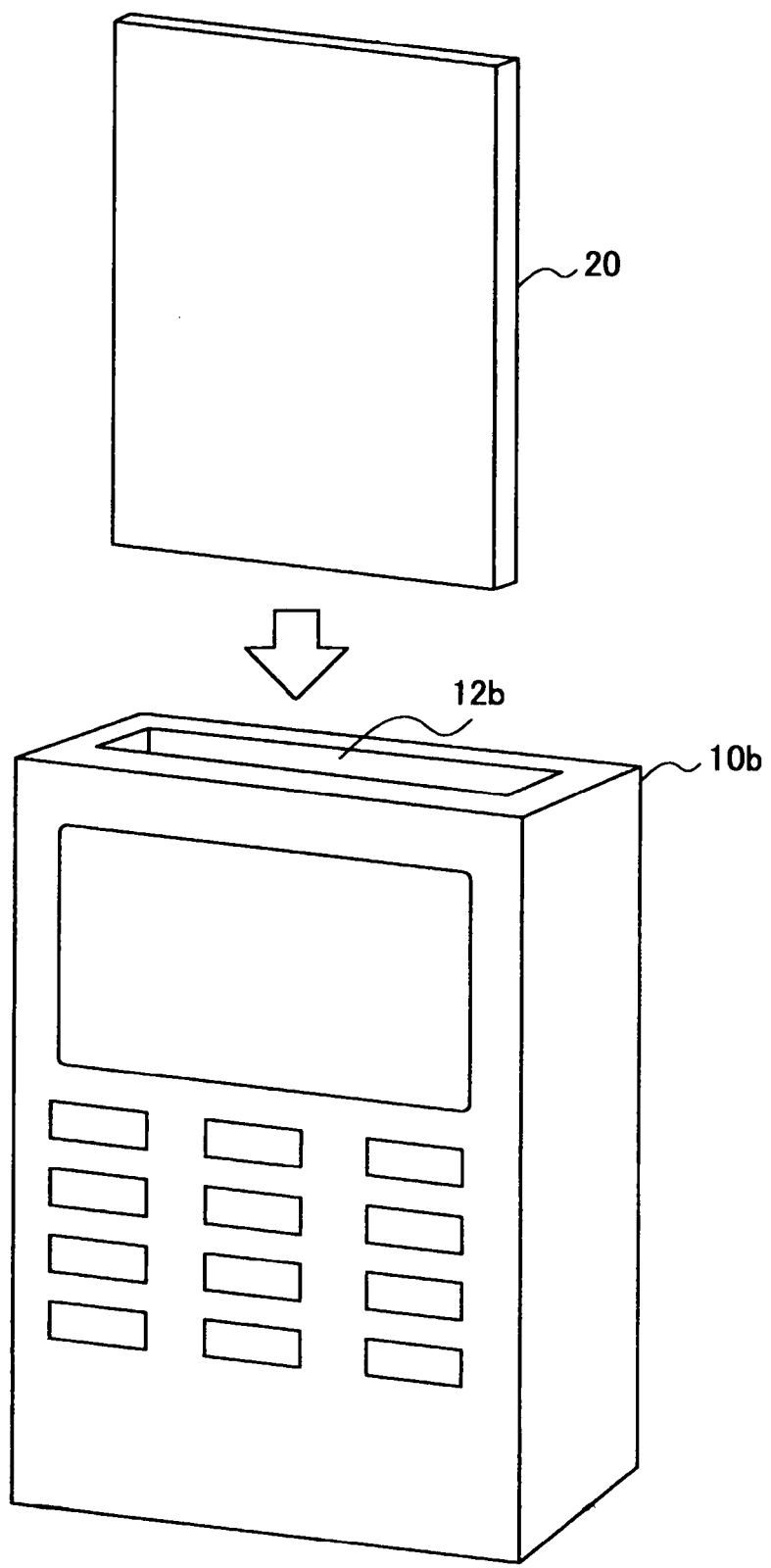
FIG. 2 is a schematic view showing another example of an information processing device according to an embodiment.

FIGS. 1 and 2 are schematic views showing an example of the information processing device 10 according to the embodiment. FIGS. 1 and 2 also show an IC card 20 capable of communicating with the information processing device 10.

FIG. 1 shows an information processing device 10a which is a stationary reader/writer that includes an information processing unit 11a and an IC card holding unit 12a as separate units.

In the information processing device 10a, the information processing unit 11a includes a control unit (not shown) or the like that controls the overall functions of the information processing device 10a, for example. The IC card holding unit 12a holds an IC card 20 at a prescribed position when the information processing device 10a transmits given information such as balance information, electronic ticket information or coupon information to the IC card 20 for recording or when it reads such information, for example.

On the other hand, FIG. 2 shows an information processing device 10b which is a portable reader/writer that includes an IC card holding unit 12b as an integrated unit. In the example of FIG. 2 also, the IC card holding unit 12b holds the IC card 20 at a prescribed position when the information processing device 10b transmits the given information to the IC card 20 for recording or when it reads such information, for example, as described above.

The information processing device 10a or 10b may be any reader/writer for an IC card, such as an electronic ticket issuing machine, an electronic payment terminal or an electronic coupon issuing machine, for example. Further, an external communication device that allows the information processing device 10 to communicate with an external device, a printing device that prints out given information onto a paper medium (both not shown) or the like may be additionally mounted on the information processing device 10a or 10b according to need. Hereinafter, the information processing devices 10a and 10b are collectively referred to as the information processing device 10, and the IC card holding units 12a and 12b are collectively referred to as the IC card holding unit 12 when there is no particular need to distinguish between them.

The IC card 20, the use of which is assumed in the embodiment, is described hereinafter.

2. Explanation of IC Card Related to the Present Invention

[2-1. Appearance of IC Card]

Figure 3:
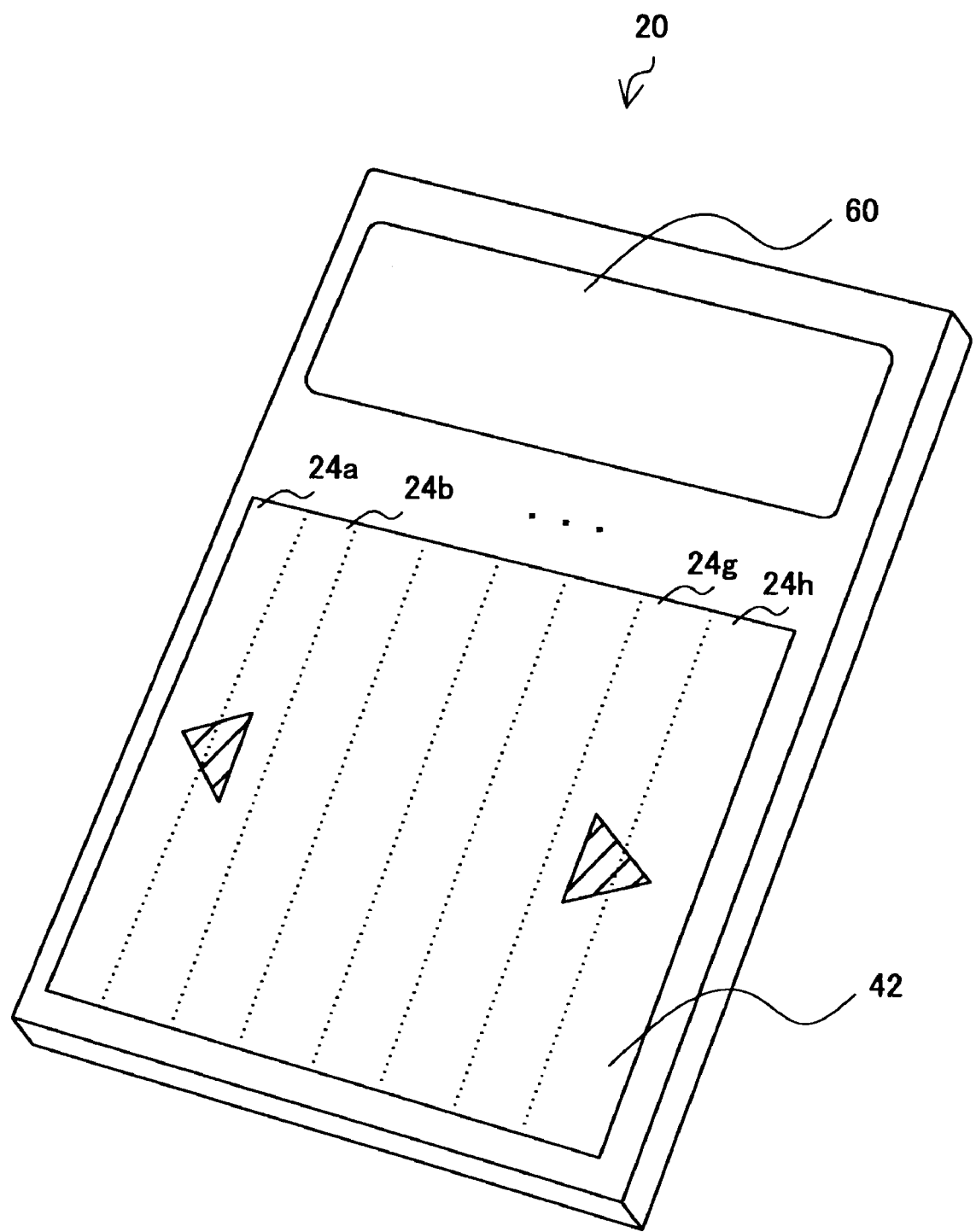
FIG. 3 is a schematic view showing an example of an appearance of an IC card related to the present invention.

FIG. 3 is a schematic view showing an appearance of the IC card 20. Referring to FIG. 3, the IC card 20 includes an operating unit 42 and a display unit 60 on its outside.

The display unit 60 is configured as a display device using an LCD (Liquid Crystal Display), an OLED (Organic Light Emitting Diode) or the like, for example. The display unit 60 displays data read from memory of the IC card 20 based on control by a control unit (not shown) placed inside the IC card 20.

The operating unit 42 serves as an operating means capable of switching display contents on the display unit 60 according to a potential difference caused by photoelectric conversion. For example, the operating unit 42 may be configured as a set of solar batteries in which eight cells 24a to 24h are connected in series as shown in FIG. 3. An electromotive force of each cell of the solar battery is determined according to the load and the amount of light received. Therefore, if a user covers any of such cells with a finger, a change occurs in potential difference according to an electromotive force of each cell, and the IC card 20 can recognize the operation by the user. For example, if the cell 24g and the cell 24h are covered in the arrangement of the cells in FIG. 3, the IC card 20 may switch the display contents on the display unit 60 in a particular direction (e.g. "next" etc.). Further, if the cell 24a and the cell 24b are covered, the IC card 20 may switch the display contents on the display unit 60 in the opposite direction (e.g. "back" etc.). The arrangement of the cells in the operating unit 42 is not limited to such an example. For example, an operation of either one direction of "next" or "back" may be recognizable in the operating unit 42.

Further, the operating unit 42 also serves as a power generating means that generates a power for driving the display unit 60, as further described later.

The appearance of the IC card 20 is not limited thereto. For example, the size, position, orientation or the like of the operating unit 42 or the display unit 60 may be varied in any way according to use of the IC card 20.

The surfaces of the cells 24a to 24h of the operating unit 42 are preferably covered with a protective film for preventing scratches or breakage due to external contact or stimulus. In this case, by using a light collecting material as a material of the protective film, an electromotive force of each cell by photoelectric conversion increases, which improves the continuous display time or the allowable power consumption of the display unit 60.

The IC card 20 has the internal configuration shown in FIG. 4, which is described hereinbelow.

[2-2. Internal Configuration of IC Card]

Figure 4:
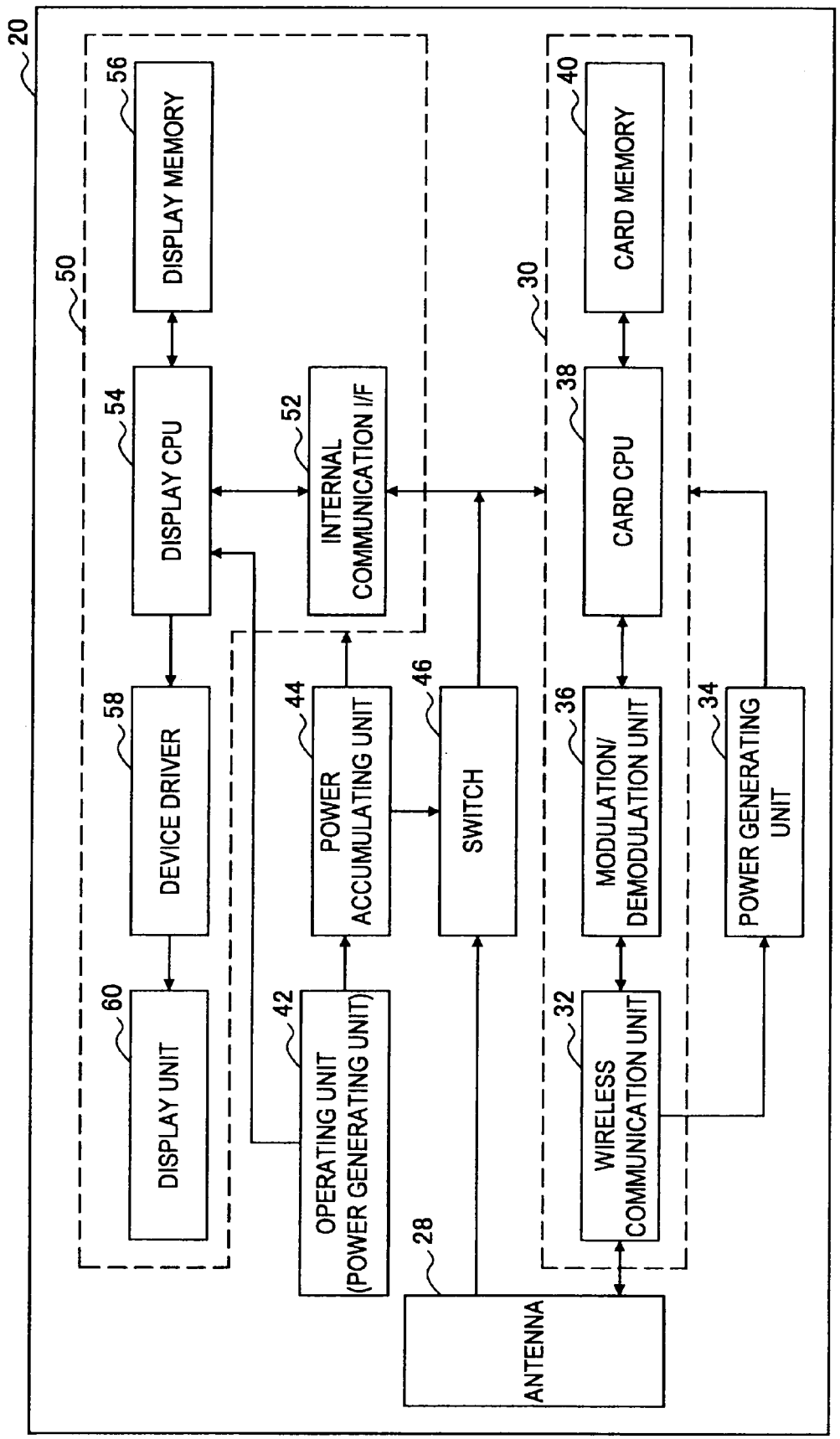
FIG. 4 is a block diagram showing an example of a configuration of an IC card related to the present invention.

FIG. 4 is a block diagram showing an example of a configuration of the IC card 20. Referring to FIG. 4, the IC card 20 includes an antenna 28, an IC card module 30, a first power generating unit 34, an operating unit (second power generating unit) 42, a power accumulating unit 44, a switch 46 and a display module 50. The IC card module 30 includes a wireless communication unit 32, a modulation/demodulation unit 36, a card CPU (Central Processing Unit) 38, and card memory 40. The display module 50 includes an internal communication I/F (interface) 52, a display CPU 54, display memory 56, a device driver 58 and a display unit 60.

In the case where the IC card 20 receives a signal, an electromagnetic wave received by the antenna 28 is amplified by the wireless communication unit 32 of the IC card module 30 and supplied to the modulation/demodulation unit 36. The modulation/demodulation unit 36 performs envelope detection of the modulated wave (ASK-modulated wave) supplied from the wireless communication unit 32 and demodulates the modulated wave according to BPSK (Binary Phase Shift Keying) or the like. Then, the modulation/demodulation unit 36 outputs an input signal obtained by demodulation to the card CPU 38. The card CPU 38 controls the operation of the IC card module 30 as a whole. For example, the card CPU 38 records the data contained in the input signal onto a prescribed write location of the card memory 40 or outputs an execution result of a prescribed command designated by the input signal to the modulation/demodulation unit 36. The card memory 40 records a program to be executed by the card CPU 38, control data, application data such as electronic ticket information or the like with use of semiconductor memory such as ROM or flash memory, for example.

In the case where the IC card 20 transmits a signal, an output signal is output from the card CPU 38 to the modulation/demodulation unit 36. The output signal contains data read from the card memory 40, an execution result of a prescribed command or the like, for example. The modulation/demodulation unit 36 modulates the output signal according to BPSK or the like, for example, and generates an ASK-modulated wave. Then, the modulation/demodulation unit 36 outputs the generated modulated wave to the wireless communication unit 32. The wireless communication unit 32 supplies the modulated wave input from the modulation/demodulation unit 36 to the antenna 28, and the output signal is transmitted from the antenna 28 by emission of an electromagnetic wave.

The first power generating unit 34 resonates the electromagnetic wave received by the antenna 28 with use of an LC circuit composed of the antenna 28 and a capacitor (not shown), for example. The first power generating unit 34 then rectifies an excited alternating-current magnetic field, stabilizes it by a voltage regulator or the like, and supplies it as a power of a direct-current power supply to the IC card module 30, for example.

On the other hand, the operating unit 42 is an operating means based on a potential difference caused by photoelectric conversion and also serves as a power generating means with use of a solar battery, for example, as described earlier with reference to FIG. 3. Specifically, the operating unit 42 photoelectrically converts externally received light (sunlight or light emitted from another light source) to generate a power, and supplies the generated power to the power accumulating unit 44, for example.

Further, the operating unit 42 detects a potential difference corresponding to an electromotive force of each of the cells 24a to 24h shown in FIG. 3 and recognizes an operation by a user. Then, the operating unit 42 outputs an operating signal indicating descriptions of the detected operation to the display CPU 54. The operating signal may be a signal designating "next" or "back" as a direction to switch the display contents on the display unit 60, for example.

The power accumulating unit 44 accumulates the power supplied from the operating unit (second power generating unit) 42 with use of a capacitor or the like, for example. The power accumulating unit 44 then supplies the accumulated power to the display module 50 and thereby drives the display module 50. The power accumulating unit 44 also supplies the accumulated power to the switch 46.

The switch 46 can be used to switch between an access from the display module 50 to the IC card module 30 and an access from the outside (the outside of the IC card 20) to the IC card module 30. However, even with the use of the switch 46, there is still a possibility that the collision of signals occur in the IC card module 30 due to an access from the display module 50 and an access from the outside of the IC card 20. In view of this, by using a communication control method according to an embodiment of the present invention which is described in detail later, it is possible to eliminate the switch 46 of the IC card 20 and reduce costs.

The display CPU 54 of the display module 50 executes a program stored in ROM (not shown) or the like, for example, and controls the operation of the display module 50 as a whole. For example, the display CPU 54 accesses the IC card module 30 through the internal communication I/F 52 and acquires the data recorded on the card memory 40. Further, the display CPU 54 records the acquired data as display data onto the display memory 56. Furthermore, the display CPU 54 acquires the display data from the display memory 56 at predetermined timing such as activation of the display module 50, for example, and displays the acquired display data on the display unit 60.

The internal communication I/F 52 allows an access from the display CPU 54 to the IC card module 30 by generating a pseudo signal equal to a command to be provided from the IC card module 30 to an external device, for example. The display CPU 54 can thereby acquire the data recorded on the card memory 40.

The display memory 56 stores control data, display data acquired from the card memory 40 by the display CPU 54 or the like, with use of semiconductor memory such as flash memory, for example. The descriptions of data recorded on the display memory 56 are described more specifically later.

The device driver 58 drives the display unit 60, which is a display device mounted on the IC card 20, according to control by the display CPU 54.

The display unit 60 is configured as a display device using an LCD or the like as described earlier with reference to FIG. 3. The display unit 60 displays the display data acquired from the display memory 56 by the display CPU 54, for example, on its screen.

The appearance and the internal configuration of the IC card 20, the use of which is assumed in the embodiment of the present invention, are described above with reference to FIGS. 3 and 4. As is understood from the above description, the IC card module 30 of the IC card 20 operates upon supply of a power generated from an electromagnetic wave received by the antenna 28. On the other hand, the display module 50 of the IC card 20 can display data on the display unit 60 with use of a power accumulated in the power accumulating unit 44 even if the IC card 20 is located in a place away from a reader/writer such as the information processing device 10 shown in FIG. 1, for example.

In the IC card 20, the display module 50 does not have its own antenna. This is because if two antennas (or two coils) are mounted on the IC card 20, a non-reactive point occurs partially in the vicinity of the IC card 20 due to the interaction between the antennas, which interferes with the communication function of the IC card 20. Therefore, the display module 50 communicates with the IC card module 30 by supplying a pseudo signal equal to a signal received from the outside to the IC card module 30 through the internal communication I/F 52, as described earlier. At this time, if a signal input from the display module 50 and a signal input from an external device through the antenna 28 collide with each other, defects such as processing error or data inconsistency can occur in the IC card module 30. In light of this, a mechanism for avoiding the collision of signals in the IC card 20 is incorporated into the information processing device 10 which serves as a reader/writer, as described in detail later.

Although the case where the IC card 20 is a contactless IC card is described above by way of illustration, the IC card 20 is not limited to a contactless IC card. If the IC card 20 is a contact IC card, a terminal and a communication unit, instead of the antenna 28 and the wireless communication unit 32, may be mounted on the IC card 20, for example.

[2-3. Exemplary Data Structure]

A structure of data related to the embodiment, among data recorded on the card memory 40 and the display memory 56 of the IC card 20, is described hereinafter.

(1) Exemplary Data Structure of Card Memory

Figure 5:
FIG. 5 is an explanatory view showing an example of a partial data structure of data recorded on card memory.

FIG. 5 is an explanatory view showing an example of a partial data structure of data recorded on the card memory 40 shown in FIG. 4.

Referring to FIG. 5, display request data is recorded at addresses X0 to X5, response control data is recorded at an address X6, application data 1 to application data M are recorded at addresses Y0 to T5 and subsequent addresses, respectively on the card memory 40.

The display request data is data for making a request for display from the IC card module 30 (or an external device) to the display module 50. In response to an instruction from an external device, the card CPU 38 of the IC card module 30 writes the display request data related to given application such as an electronic ticket or an electronic coupon to the addresses X0 to X5. The display request data may be any data that can be displayed on the display unit 60 of the display module 50, such as text data or bitmap data, for example.

The response control data is data for controlling a display request from the IC card module 30 to the display module 50 and a response. For example, in response to an instruction from an external device, the card CPU 38 of the IC card module 30 writes data requested to be displayed as the display request data and further writes a prescribed bit string designating acquisition of the display request data by the display module 50 onto the response control data. Further, the display CPU 54 of the display module 50 writes a prescribed bit string indicating a success of acquisition of the display request data onto the response control data when acquisition of the display request data succeeds, for example. On the other hand, the display CPU 54 writes a prescribed bit string (error code) indicating a failure of acquisition of the display request data onto the response control data when acquisition of the display request data fails, for example. The kind of an error (a data length error, a command error etc.) may be identifiable by the value of an error code, for example.

With use of such response control data, the status of data coordination between the IC card module 30 and the display module 50 is shared with an external device. It is thereby possible to prevent data inconsistency between the IC card module 30 and the display module 50 by inhibiting writing of new data from an external device until acquisition of the display request data by the display module 50 is completed, for example.

The application data 1 through the application data M are arbitrary data related to various applications provided by the IC card 20. The application data 1 through the application data M may contain balance information, electronic ticket information, coupon information or the like, for example, as described earlier.

The balance information that is likely to be used in common by a plurality of applications may be held at a particular address which is different from the application data 1 through the application data M, not restricted to the example of FIG. 5. Further, the card memory 40 may store any data other than the data shown in FIG. 5.

(2) Exemplary Data Structure of Display Memory

Figure 6:
FIG. 6 is an explanatory view showing an example of a data structure of data recorded on display memory.

FIG. 6 is an explanatory view showing an example of a data structure of data recorded on the display memory 56 shown in FIG. 4.

Referring to FIG. 6, a card identifier is recorded at an address 01, display control data is recorded at an address 02, a display sequence table is recorded at an address 03, and display data 1 to display data N are recorded at addresses K0 to K5 and subsequent addresses, respectively on the display memory 56.

The card identifier is an identifier for identifying an individual piece of the IC card module 30 to be accessed by the display module 50. Generally, when an external device makes an access to the IC card, a polling command is issued from the external device, and the card identifier is acquired in response thereto. The external device can thereby identify the IC card to be communicated with from a plurality of IC cards. On the other hand, in this embodiment, a combination of the IC card module 30 and the display module 50 that are incorporated in the IC card 20 is fixed. Thus, by recording the card identifier that identifies an individual piece of the IC card module 30 onto the display memory 56 in advance, it is possible to eliminate the polling processing and thereby reduce the power consumption and the processing time in the IC card 20. The card identifier may be acquired by a polling command upon initial startup after the display module 50 is incorporated into the IC card 20, or may be written by a manufacturing device during manufacture.

The display control data is data for controlling display processing by the display module 50. For example, the display control data can contain address data such as a memory address at which the response control data is stored in the card memory 40 of the IC card module 30.

The display sequence table defines in what sequence the display data 1 to the display data N at the addresses K0 to K5 and subsequent addresses are displayed on the display unit 60. The display sequence table may be data that lists the addresses (or block numbers etc.) of the display data 1 to the display data N in the sequence of displaying the data on the display unit 60, for example. Further, the display sequence table may contain data that defines the kind of display sequence such as a sequence of memory or a sequence of date. Furthermore, the display sequence table may contain an address of initial display data to be displayed initially on the display unit 60. A plurality of display sequence tables may be recorded on the display memory 56. In this case, serial numbers may be assigned to the respective display sequence tables, for example, and a display sequence of data on the display unit 60 may be selected as appropriate from a plurality of patterns.

The display data 1 to the display data N are data that can be displayed on the display unit 60. As described earlier, the display CPU 54 records the display request data acquired from the card memory 40 of the IC card module 30 as display data onto any memory location of the display data 1 to the display data N. Then, the display data is read by the display CPU 54 in the sequence according to the display sequence table and displayed on the display unit 60.

An example of the data structure of data that can be recorded on the card memory 40 and the display memory 56 of the IC card 20 is described above with reference to FIGS. 5 and 6. Hereinafter, display processing executed by the IC card 20 is described.

[2-4. Display Processing by IC Card]

Figure 7:
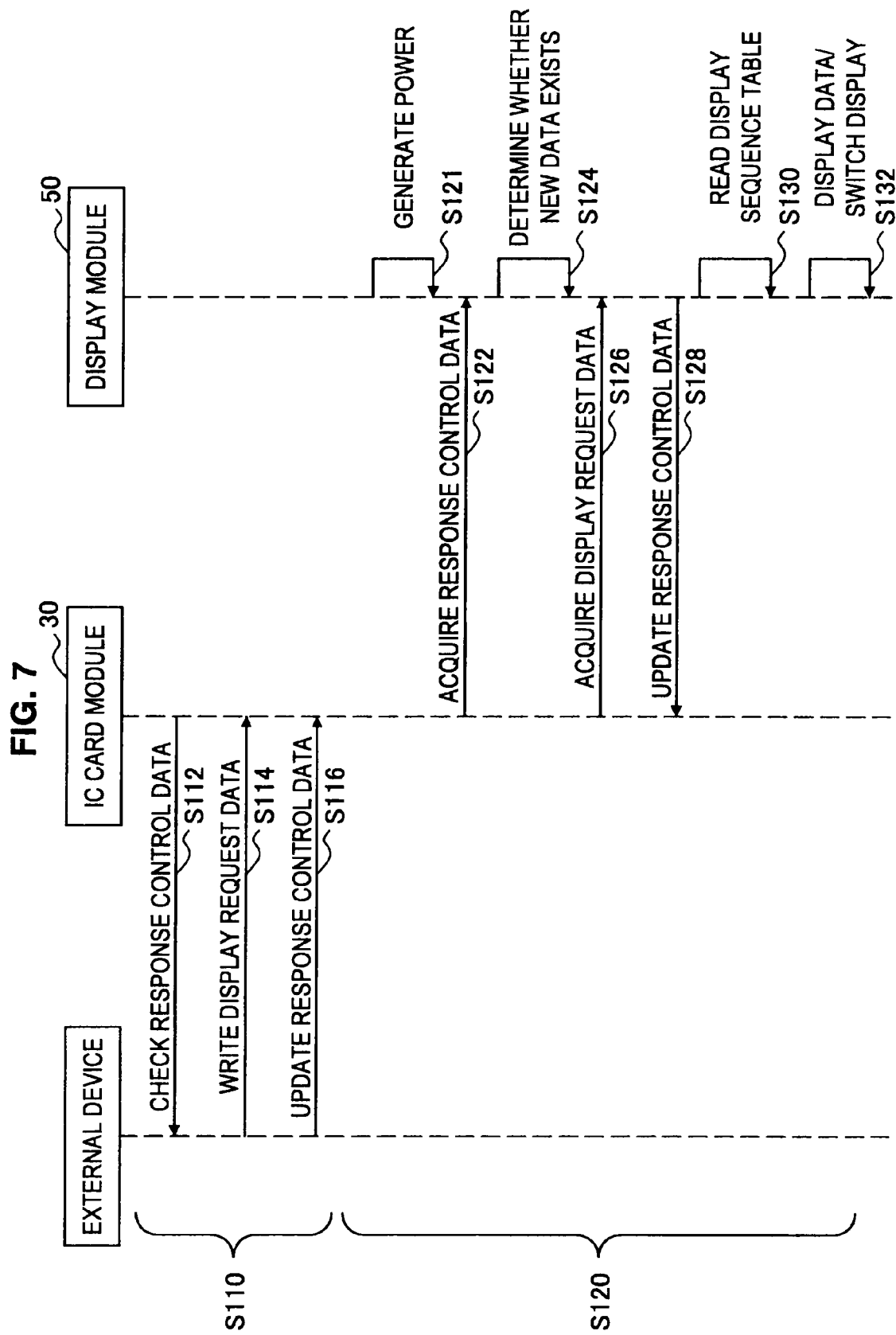
FIG. 7 is a sequence chart showing an example of a flow of display processing by an IC card related to the present invention.

FIG. 7 is a sequence chart showing an example of a flow of display processing by the IC card 20. FIG. 7 shows processing including a writing phase (S110) in which data is written from an external device such as a reader/writer to the IC card 20 and a display phase (S120) in which the data is displayed on the display unit 60 of the IC card 20.

Referring to FIG. 7, in a writing phase S110, the external device first acquires the response control data from the card memory 40 in the IC card module 30 and checks whether the display request data that is not yet captured into the display module 50 remains or not (S112). If the response control data indicates that there remains the uncaptured display request data, the external device cancels the subsequent processing. On the other hand, if there is no uncaptured display request data remaining, the display request data is written to the card memory 40 of the IC card module 30 in response to an instruction from the external device (S114). For efficient processing, it is suitable to write the application data corresponding to the display request data simultaneously to the card memory 40. Further, the external device updates the response control data on the card memory 40 to a prescribed bit string that designates data acquisition by the display module 50 (S116).

After that, in a display phase S120, when the operating unit (second power generating unit) 42 of the IC card 20 receives light and a power high enough to drive the display module 50 is accumulated in the power accumulating unit 44, the display module 50 is activated (S121). Then, the display CPU 54 of the display module 50 accesses the IC card module 30 and acquires the response control data recorded on the card memory 40 (S122). The display CPU 54 then determines whether new display request data is written or not by referring to the bit string of the response control data (S124). If the new display request data is not written, the processing in the subsequent steps S126 and S128 is skipped. If, on the other hand, the new display request data is written, the display CPU 54 accesses the IC card module 30 and acquires the display request data recorded on the card memory 40 and then writes the data to the display memory 56 (S126). Further, if the display CPU 54 successfully acquires the display request data, the display CPU 54 updates the response control data on the card memory 40 to a prescribed bit string that indicates a success of acquisition of the display request data (S128). Then, the display CPU 54 reads the display sequence table from the display memory 56 (S130) and displays the display data 1 to N on the display unit 60 sequentially according to the display sequence table (S132). At this time, if the display CPU 54 detects that an operation designating switching of display contents is performed through the operating unit 42, the display CPU 54 switches the display data being displayed on the display unit 60 into other display data.

Compared to the communication processing from S122 to S128 by the display module 50, a high processing speed is not demanded for the display processing after S130. For example, while a processing speed of the communication processing is about several tens of MHz, a processing speed of the display processing can be about several tens of kHz. Therefore, the display module 50 can save power consumption by temporarily increasing a processing clock speed only during the steps S122 to S128. The IC card 20 can thereby display the data written from the external device for a user.

In the writing phase S110, for example, if the display module 50 makes an access to the IC card module 30, there is a possibility that an input signal from the display module 50 and an input signal from the external device collide with each other in the IC card module 30. Likewise, in the display phase S120, for example, if an electromagnetic wave is emitted from the external device, there is a possibility that an input signal from the external device and an input signal from the display module 50 collide with each other in the IC card module 30. In order to avoid the collision of signals, data writing to the IC card 20 is performed by using the information processing device 10 according to an embodiment of the present invention, which is described hereinbelow, as the external device.

3. Configuration of Information Processing Device According to Embodiment

Figure 8:
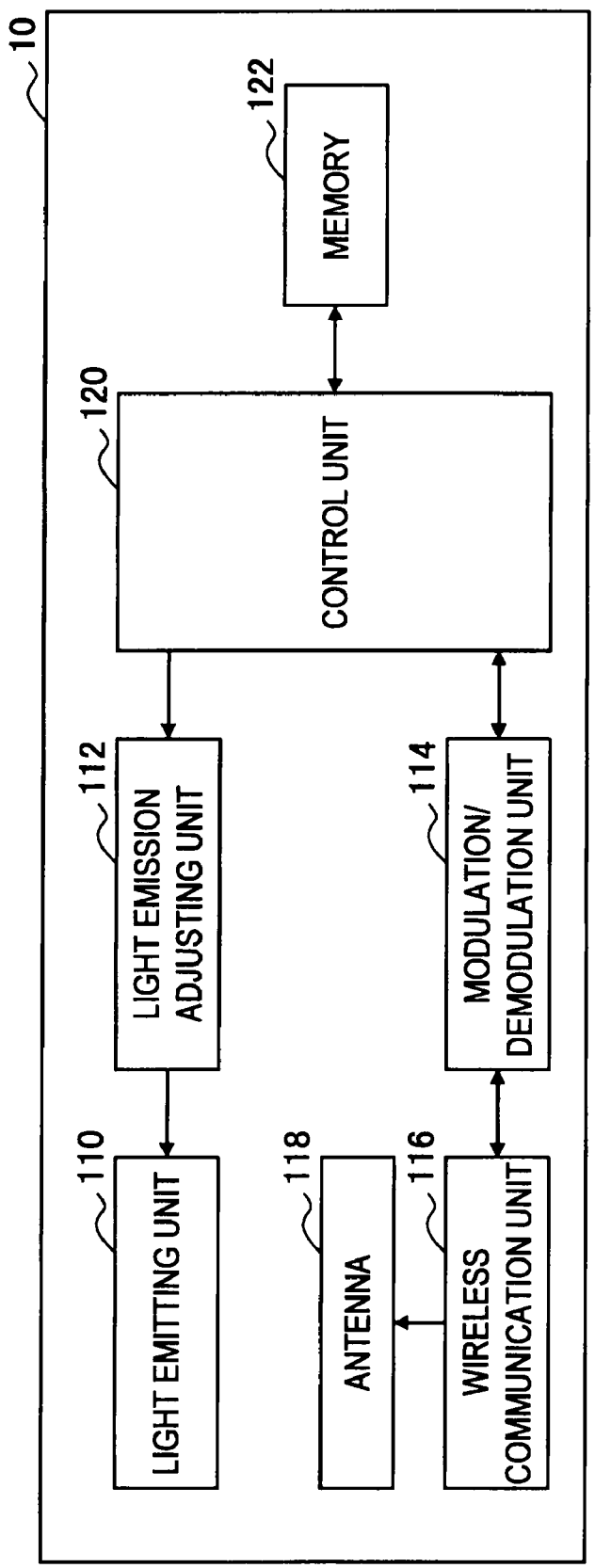
FIG. 8 is a block diagram showing an example of a configuration of an information processing device according to an embodiment.

FIG. 8 is a block diagram showing an example of a configuration of the information processing device 10 according to an embodiment of the present invention.

Referring to FIG. 8, the information processing device 10 includes a light emitting unit 110, a light emission adjusting unit 112, a modulation/demodulation unit 114, a wireless communication unit 116, an antenna 118, a control unit 120 and memory 122.

[3-1. Light Emitting Unit]

The light emitting unit 110 supplies light to a power generating means that is mounted on the IC card 20 held by the IC card holding unit 12 and generates a power by photoelectric conversion. The power generating means of the IC card 20 corresponds to the operating unit (second power generating unit) 42 of the IC card 20, which is described earlier with reference to FIGS. 3 and 4, for example. Specifically, the light emitting unit 110 includes a light emitting element such as an LED (Light Emitting Diode) or a light emitter such as a fluorescent tube or an electric bulb, for example, which is capable of applying light to the operating unit 42 of the IC card 20 that is held by the IC card holding unit 12, for example. Then, the light emitting unit 110 applies light to the power generating means of the IC card to control by the light emission adjusting unit 112, which is described later, and drives the display module of the IC card.

Further, the light emitting unit 110 may supply light to the power generating means by a first light emitting pattern that drives the display unit of the IC card and a second light emitting pattern that switches display contents on the display unit of the IC card, for example.

Figure 9:
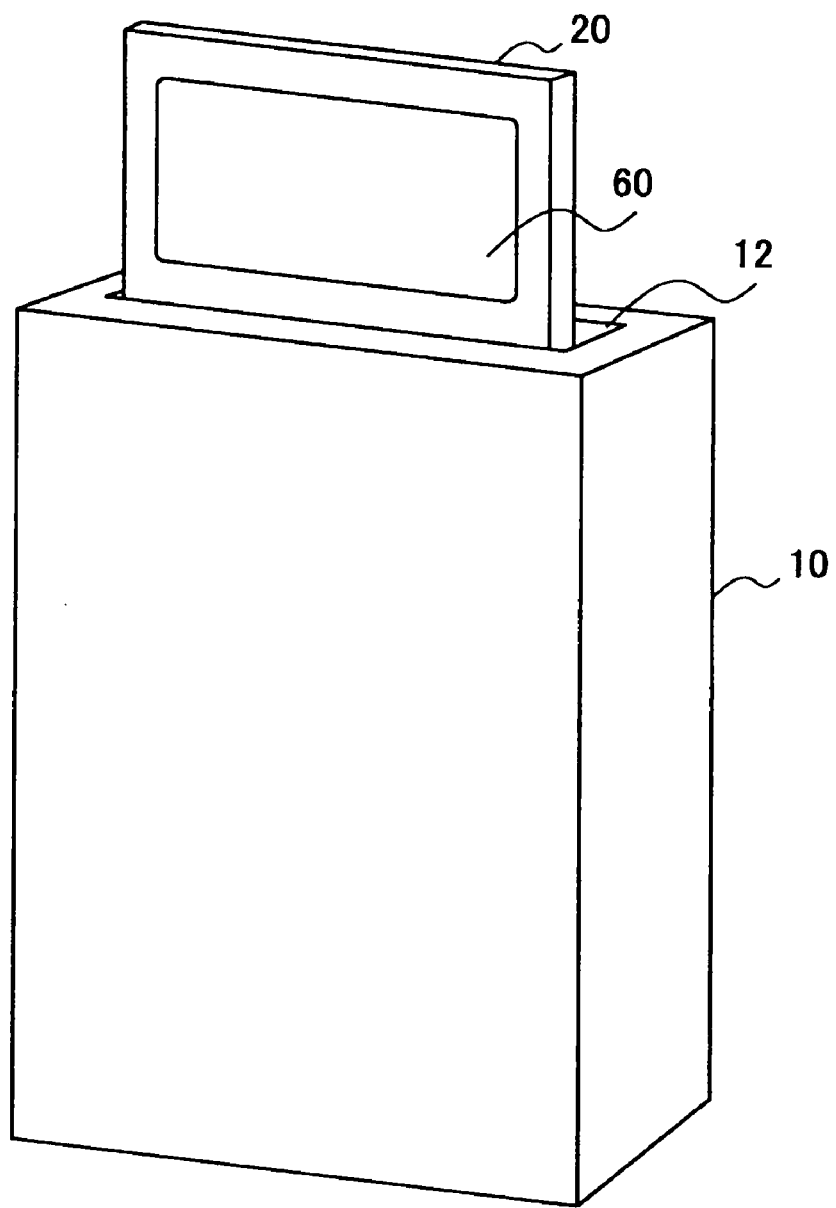
FIG. 9 is a schematic view showing an IC card being held by an information processing device according to an embodiment.

FIG. 9 is a schematic view showing the IC card 20 being held by the IC card holding unit 12 of the information processing device 10.

Referring to FIG. 9, the IC card 20 is inserted into the IC card holding unit 12 of the information processing device 10. At this time, the position of the IC card 20 is adjusted in such a way that the display unit 60 is visible for a user of the information processing device 10 and external light does not reach the operating unit 42.

Figures 10, 11:
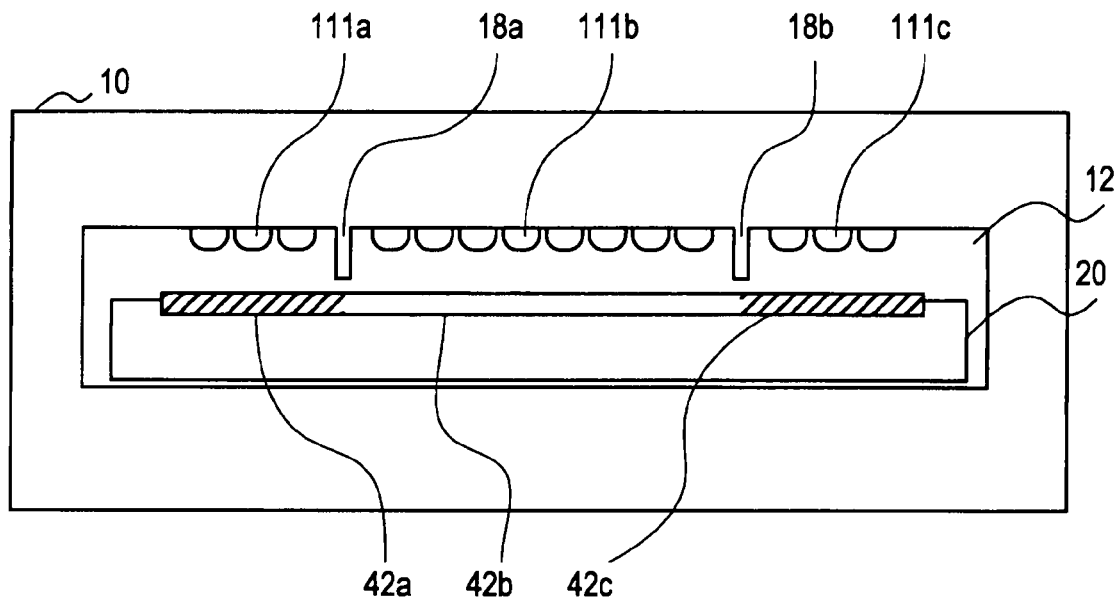
FIG. 10 is a schematic view showing the IC card being held when viewed from the direction A of FIG. 9.
FIG. 11 is an explanatory view to describe light emitting patterns of a light emitting unit.

FIG. 10 is a schematic view showing the state where the inside of the IC card holding unit 12 is viewed from the direction A of FIG. 9.

Referring to FIG. 10, the IC card 20 that is held by the IC card holding unit 12 of the information processing device 10 is shown with the surface having the operating unit 42 (which is referred to hereinafter as an operating surface) facing up.

In FIG. 10, the operating unit 42 is divided into three operating sections 42a, 42b and 42c. The first operating section 42a corresponds to the cell 24g and the cell 24h of the operating unit 42 shown in FIG. 3, for example. The second operating section 42b corresponds to the cell 24c to the cell 24f of the operating unit 42 shown in FIG. 3, for example. The third operating section 42c corresponds to the cell 24a and the cell 24b of the operating unit 42 shown in FIG. 3, for example.

On the other hand, a plurality of light emitting elements included in the light emitting unit 110 are placed on the surface on the inside of the IC card holding unit 12 of the information processing device 10 which is placed opposite to the operating surface of the IC card 20. The light emitting elements are divided into three light emitting sections 111a, 111b and 111c by dividers 18a and 18b. The first light emitting section 111a is placed opposite to the first operating section 42a of the IC card 20. The second light emitting section 111b is placed opposite to the second operating section 42b of the IC card 20. The third light emitting section 111c is placed opposite to the third operating section 42c of the IC card 20.

With such three light emitting sections 111a, 111b and 111c, the light emitting unit 110 can apply light to the operating unit 42 of the IC card 20 with a prescribed light emitting pattern so as to switch the contents displayed on the display unit 60 of the IC card 20.

In FIG. 10, the divider 18a is placed in order that light from the first light emitting section 111a does not reach the second operating section 42b, and light from the second light emitting section 111b does not reach the first operating section 42a. Likewise, the divider 18b is placed in order that light from the second light emitting section 111b does not reach the third operating section 42c, and light from the third light emitting section 111c does not reach the second operating section 42b.

FIG. 11 is an explanatory view to describe a relationship between light emitting patterns by the light emitting unit 110 and details of an operation detected by the operating unit 42 of the IC card 20.

Referring to FIG. 11, four light emitting patterns A to D are defined. The light emitting pattern A indicates the state where all of the first light emitting section 111a, the second light emitting section 111b and the third light emitting section 111c are lighting up. In this pattern, light is applied to all the operating sections 42a to 42c of the operating unit 42 of the IC card 20, and therefore the IC card 20 can drive the display unit 60 by using a power generated by the operating unit 42.

The light emitting pattern B indicates the state where the first light emitting section 111a is lighting off and the second light emitting section 111b and the third light emitting section 111c are lighting up. In this pattern, light is not applied to the first operating section 42a of the operating unit 42 of the IC card 20, and light is applied to the second operating section 42b and the third operating section 42c of the operating unit 42 of the IC card 20. This is the same state as when the cell 24g and the cell 24h are covered in the operating unit 42 of the IC card 20, and the IC card 20 switches the display contents on the display unit 60 in the direction of "next", for example.

The light emitting pattern C indicates the state where the first light emitting section 111a and the second light emitting section 111b are lighting up, and the third light emitting section 111c is lighting off. In this pattern, light is applied to the first operating section 42a and the second operating section 42b of the operating unit 42 of the IC card 20, and light is not applied to the third operating section 42c of the operating unit 42 of the IC card 20. This is the same state as when the cell 24a and the cell 24b are covered in the operating unit 42 of the IC card 20, and the IC card 20 switches the display contents on the display unit 60 in the direction of "back", for example.

The light emitting pattern D indicates the state where all of the first light emitting section 111a, the second light emitting section 111b and the third light emitting section 111c are lighting off. In this pattern, light is not applied to any of the operating sections 42a to 42c of the operating unit 42 of the IC card 20, and therefore the IC card 20 cannot drive the display unit 60 unless a power accumulated in the power accumulating unit 44 remains, for example.

FIG. 11 shows the case of controlling supply of light to the IC card 20 by turning on or off the light emitting elements included in the light emitting unit 110 with respect to each light emitting section. However, a method of controlling supply of light to the IC card 20 is not limited thereto. For example, a shutter may be placed at the front of each light emitting section, and supply of light to the IC card 20 may be controlled by opening or closing the shutter.

The number, shape and position of light emitting sections of the light emitting unit 110 and the number of dividers can be set according to the specifications of the number, shape and position of operating sections of the operating unit 42 of the IC card 20 or the like. For example, if only the "next" operation is recognizable in the operating unit 42, the number of light emitting sections of the light emitting unit 110 may be two, and the number of dividers may be one. Further, a plurality of light emitting patterns may be prepared for one operation in order to be compatible with use of a plurality of different IC cards in the information processing device 10, for example.

Referring back to FIG. 8, an example of a logical configuration of the information processing device 10 is further described.

[3-2. Light Emission Adjusting Unit]

The light emission adjusting unit 112 allows the data recorded on the IC card 20 through the modulation/demodulation unit 114, the wireless communication unit 116 and the antenna 118 by the control unit 120, which is described later, to be displayed on the display unit 60 of the IC card 20 by adjusting the number of times of emitting light or the light emitting pattern from the light emitting unit 110. Specifically, after the control unit 120 records given data onto the IC card 20, the light emission adjusting unit 112 acquires information about a write location for the data on the memory of the IC card 20 from the control unit 120. Then, the light emission adjusting unit 112 determines the number of times of emitting light or the light emitting pattern from the light emitting unit 110 according to the acquired write location. After that, the light emission adjusting unit 112 causes the light emitting unit 110 to supply light to the IC card 20 by the determined number of times of emitting light or light emitting pattern. As a result, the contents displayed on the display unit 60 of the IC card 20 are switched to the data recorded on the IC card 20 by the control unit 120. A user can thereby check the data written to the IC card 20 by looking at the display unit 60 of the IC card 20 without taking off the IC card 20 from the information processing device 10 for operation. The function of the light emission adjusting unit 112 described above may be directly executed by the control unit 120.

[3-3. Modulation/Demodulation Unit, Wireless Communication Unit and Antenna]

The modulation/demodulation unit 114, the wireless communication unit 116 and the antenna 118 serve as a communication module by which the information processing device 10 transmits a prescribed command to the IC card 20 and the information processing device 10 receives a response from the IC card 20.

For example, in the case where the information processing device 10 writes data to the IC card 20, an output signal that contains a command designating data writing and data is output from the control unit 120 to the modulation/demodulation unit 114. The modulation/demodulation unit 114 modulates the output signal according to BPSK or the like, for example, and generates an ASK-modulated wave. Then, the modulation/demodulation unit 114 outputs the generated modulated wave to the wireless communication unit 116. The wireless communication unit 116 supplies the modulated wave input from the modulation/demodulation unit 114 to the antenna 118, and the output signal is transmitted from the antenna 118 by emission of an electromagnetic wave.

Further, in the case where the information processing device 10 reads data from the IC card 20, a command designating data reading is transmitted to the IC card 20, as in the case of data writing described above. Then, a response signal containing prescribed data is transmitted by return from the IC card 20 and received by the antenna 118. Then, the response signal (ASK-modulated wave) received by the antenna 118 is amplified by the wireless communication unit 116 and supplied to the modulation/demodulation unit 114. The modulation/demodulation unit 114 performs envelope detection of the modulated wave supplied from the wireless communication unit 116 and demodulates the modulated wave according to BPSK or the like, for example. Then, the modulation/demodulation unit 114 outputs the demodulated response signal to the control unit 120.

[3-4. Control Unit]

The control unit 120 executes a program recorded on the memory 122, for example, by using a processing unit such as a CPU or an MPU, and thereby controls the operation of the information processing device 10 as a whole.

In the writing phase S110 shown in FIG. 7, for example, the control unit 120 transmits a prescribed data write command to the IC card 20 through the modulation/demodulation unit 114, the wireless communication unit 116 and the antenna 118. Further, in the display phase S120 shown in FIG. 7, for example, the control unit 120 causes the light emitting unit 110 to supply light to the IC card 20 by means of the light emission adjusting unit 112 and thereby drives the display module 50 of the IC card 20.

During communication with the IC card 20 through the modulation/demodulation unit 114, the wireless communication unit 116 and the antenna 118, for example, the control unit 120 stops supply of light from the light emitting unit 110 to the IC card 20. Further, during supply of light from the light emitting unit 110 to the IC card 20, for example, the control unit 120 stops communication with the IC card 20 through the modulation/demodulation unit 114, the wireless communication unit 116 and the antenna 118. Furthermore, when writing display request data or the like to the IC card 20, for example, after data recording by the IC card 20 ends, the control unit 120 first stops transmission of a signal to the IC card 20 and then starts supply of light from the light emitting unit 110. By such writing control by the control unit 120, it is possible to prevent the occurrence of processing error or data inconsistency due to the collision of signals in the IC card 20.

It is necessary for the control unit 120 to restart communication with the IC card 20 after waiting for the completion of data capture to the display module 50 in the IC card 20. However, the control unit 120 is unable to check the response control data in the card memory 40 of the IC card 20 while waiting for data capture to the display module 50 in order to prevent a command designating reading of the response control data from causing the collision of signals. Thus, the control unit 120 restarts communication with the IC card 20 after the lapse of a predetermined waiting time from the start or stop of light supply from the light emitting unit 110, for example. The waiting time can be set as the period of time enough for data capture and display switching by the display module 50 of the IC card 20 to be completed, for example, in advance by an experiment or the like. Further, the control unit 120 may determine the timing to restart communication with the IC card 20 based on an image imaged by an imaging means, which is mounted additionally, after starting supply of light by the light emitting unit 110, as described later.

The memory 122 stores a program to be executed by the control unit 120, control data or the like by using semiconductor memory such as ROM or flash memory, for example.

The configuration of the information processing device 10 according to the embodiment of the present invention is described above with reference to FIGS. 8 to 11. An example of a flow of writing control processing that is executed in such a configuration is described hereinbelow.

4. Flow of Writing Control Processing According to Embodiment

Figure 12:
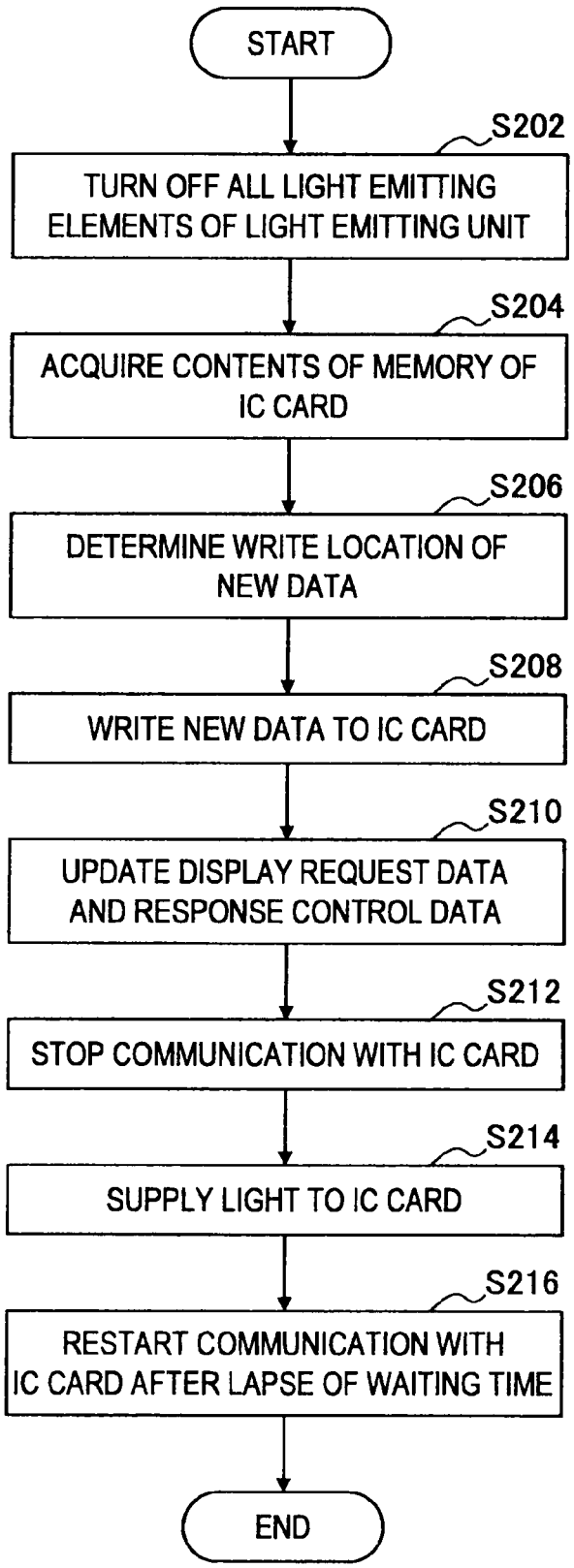
FIG. 12 is a flowchart showing an example of a flow of writing control processing by an information processing device according to an embodiment.

FIG. 12 is a flowchart showing an example of a flow of writing control processing by the information processing device 10 according to the embodiment of the present invention. The following description is based on an assumption that the IC card 20 has a function of displaying electronic ticket information and a user issues a new electronic ticket to the IC card 20 with use of the information processing device 10, which serves as a reader/writer.

Referring to FIG. 12, when an instruction for data writing to the IC card 20 is input by a user, for example, the control unit 120 instructs the light emission adjusting unit 112 to turn off all the light emitting elements of the light emitting unit 110 and thereby stop supply of light to the IC card 20 (S202).

Next, the control unit 120 transmits a command to the IC card 20 and acquires the contents of the memory from the card memory 40 in the IC card 20 (S204). The contents of the memory includes electronic ticket information that has been recorded, response control data (cf. S112 of FIG. 7) for confirming that there is no uncaptured display request data remaining and so on.

Next, the control unit 120 determines a write location on the card memory 40 for writing new electronic ticket information based on the descriptions of the acquired electronic ticket information (S206). The write location may be a location indicating an arbitrary free space in an electronic ticket information storage area in the card memory 40, for example.

If uncaptured display request data remains in the card memory 40 before this step, it is preferred to execute this step after executing the steps S212 to S216, which are described later, beforehand and completing data capture to the display module 50 of the IC card 20. In the case where data capture is not completed even after executing the steps S212 to S216, the IC card is treated as a defective card.

Then, the control unit 120 transmits a command to the IC card 20 and writes new electronic ticket information to the write location on the card memory 40 which is determined in the step S206 (S208). In this step, a response containing a status indicating whether writing of the new electronic ticket information succeeds or not is transmitted by return from the IC card 20.

If writing of the electronic ticket information succeeds, the control unit 120 writes data to be displayed related to the issued electronic ticket information as the display request data to the card memory 40 of the IC card 20 and further updates the response control data to a prescribed bit string (S210). The step S210 in the flowchart of FIG. 12 corresponds to the steps S114 and S116 of the display processing by the IC card 20 which is described earlier with reference to FIG. 7. The control unit 120 then stops supply of a signal from the modulation/demodulation unit 114, the wireless communication unit 116 and the antenna 118 to the IC card 20 (S212).

After that, the control unit 120 instructs the light emission adjusting unit 112 to supply light to the IC card 20 (S214). In this step, the light emission adjusting unit 112 determines the number of times of emitting light and the light emitting pattern according to the write location of the new electronic ticket information acquired from the control unit 120, and causes the light emitting unit 110 to supply light to the IC card 20 according to the number of times of emitting light and the light emitting pattern. It is assumed, for example, that the write location is the m-th location in the electronic ticket information write area on the card memory 40, and the display module 50 of the IC card 20 displays the electronic ticket information simply in the sequence of memory. In this case, the light emission adjusting unit 112 repeats light emission by the light emitting pattern B and the light emitting pattern A alternately m-number of times after light emission by the light emitting pattern A shown in FIG. 11, for example. Alternatively, the light emission adjusting unit 112 may acquire the contents of the display sequence table acquired from the IC card 20 by the control unit 120, for example, and determine the number of times of emitting light and the light emitting pattern according to the contents of the display sequence table.

If light supply to the IC card 20 is started, a power is accumulated in the power accumulating unit 44 of the IC card 20, and the display module 50 is activated. Then, display request data of the card memory 40 is captured into the display memory 56 by the display CPU 54. Further, the data written to the IC card 20 is displayed on the display unit 60 of the IC card 20. A user thereby confirms that the new electronic ticket information is normally captured into the display module 50 of the IC card 20 at the sight of the display unit 60 of the IC card 20.

Then, when a predetermined waiting time that is set in advance by an experiment or the like, for example, has elapsed, the control unit 120 restarts communication with the IC card 20 (S216). The control unit 120 can thereby confirm whether capture of the data by the display module 50 of the IC card 20 is normally completed or not by reading the response control data in the card memory 40 of the IC card 20, for example.

In the step S216, there is a possibility that an error in which the display contents on the display unit 60 of the IC card 20 cannot be switched an appropriate number of times occurs due to delay of sampling a potential difference in the operating unit 42 of the IC card 20, for example. In light of this, the information processing device 10 may be configured in such a way that a user can further give an instruction for supplying light from the light emitting unit 110 with a prescribed light emitting pattern through a user interface such as a keyboard, a button or a switch mounted on the information processing device 10, for example. A user can thereby confirm a data writing result without taking off the IC card 20 from the information processing device 10, even when the above error occurs, by giving a supplementary instruction.

5. Explanation of Alternative Example

The information processing device 10 according to the embodiment of the present invention may be configured as described in the following alternative example, for example.

Figure 13:
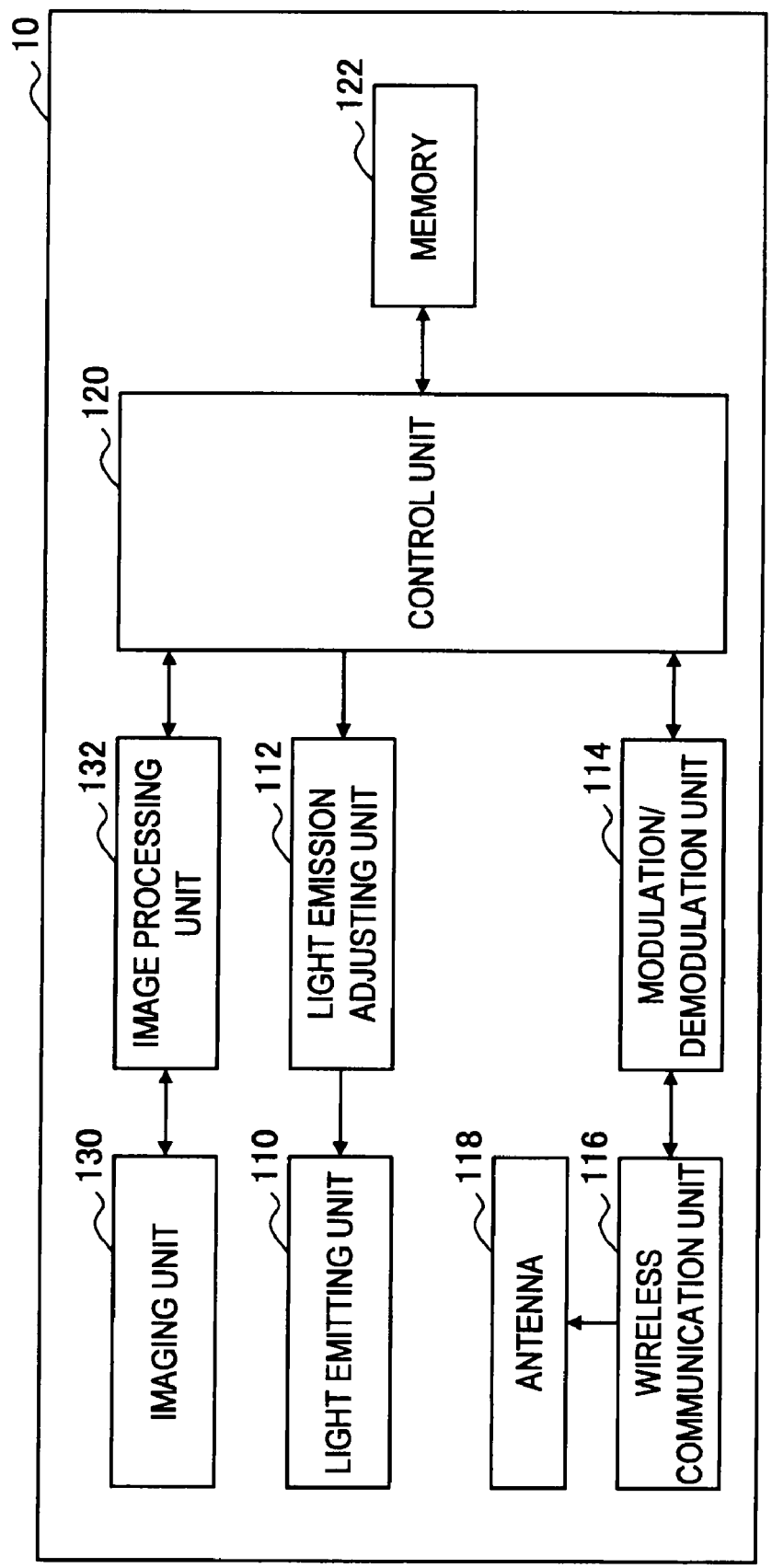
FIG. 13 is a block diagram showing an example of a configuration of an information processing device according to an alternative example.

FIG. 13 is a block diagram showing a configuration of an alternative example of the information processing device 10 according to the embodiment. Referring to FIG. 13, the information processing device 10 includes an imaging unit 130 and an image processing unit 132 in addition to all the blocks shown in FIG. 8.

The imaging unit 130 can image the display contents on the display unit 60 of the IC card 20 by using an image pickup device such as a CCD (Charge Coupled Device) or a CMOS (Complementary Metal-Oxide Semiconductor), for example. Further, the imaging unit 130 outputs an image obtained by imaging to the image processing unit 132.

The image processing unit 132 determines whether writing of data to the IC card 20 succeeds or not by verifying the image input from the imaging unit 130 against the data recorded on the IC card 20 by the information processing device 10. For example, the image processing unit 132 may determine match or mismatch between a picture image created from the data written to the IC card 20 and the obtained image by pattern matching. Further, the image processing unit 132 may determine match or mismatch by comparing textual information extracted from the obtained image and the data written to the IC card 20, for example. A result of the verification by the image processing unit 132 can be displayed on a screen of the information processing device 10 shown in FIG. 1 or 2, for example. This eliminates the need for visual check of a data writing result by a user, which further enhances the convenience for a user.

Further, the image processing unit 132 may determine whether capture of the data recorded on the IC card 20 by the control unit 120 into the display module 50 is completed or not based on an image imaged by the imaging unit 130. For example, the image processing unit 132 can determine a change in the display contents on the display unit 60 of the IC card 20 by comparing a plurality of images captured in chronological order. Then, the control unit 120 may restart communication with the control unit 120 which has been in the waiting state after the image processing unit 132 determines that capture of the data into the display module 50 is completed. This eliminates the need to set a waiting time for communication in advance by an experiment or the like.

6. Summary

The information processing device 10 according to the embodiment of the present invention is described above with reference to FIGS. 1 to 13. Principal features of the information processing device 10 according to the embodiment are as follows.

According to the embodiment, the information processing device 10 includes a communication unit (the modulation/demodulation unit 114, the wireless communication unit 116 and the antenna 118) capable of communicating with the IC card 20 and the light emitting unit 110 capable of supplying light to the operating unit 42 of the IC card 20. During communication with the IC card 20, the control unit 120 of the information processing device 10 stops supply of light from the light emitting unit 110. Further, during supply of light from the light emitting unit 110 to the IC card 20, the control unit 120 stops transmission of a signal to the IC card 20. It is thereby possible to prevent the occurrence of processing error or data inconsistency in the IC card 20 due to simultaneous access to the IC card module 30 by the display module 50 and the information processing device 10.

Other features of the information processing device 10 different from those described above also contribute to merits such as improvement of the safety of processing or improvement of the convenience which are provided by the information processing device 10 according to the embodiment, as a matter of course.

Further, a series of processing by the information processing device 10 or the IC card 20 described above may be implemented by hardware or software. In the case of executing a series of or a part of processing by software, a program constituting the software is prestored in ROM, loaded to RAM upon execution and then executed by a CPU.

It should be understood by those skilled in the art that various modifications, combinations, sub-combinations and alterations may occur depending on design requirements and other factors insofar as they are within the scope of the appended claims or the equivalents thereof.

For example, it is not necessary to perform the writing control processing according to the embodiment described with reference to FIG. 12 in accordance with the sequence shown in the flowchart. Each step may include processing which is executed in parallel or individually.

The present application contains subject matter related to that disclosed in Japanese Priority Patent Application JP 2008-314798 filed in the Japan Patent Office on Dec. 10, 2008, the entire content of which is hereby incorporated by reference.

What is claimed is:

1. An information processing device, comprising:
    a light emitting unit to supply light to a power generating unit mounted on an IC card that includes a display unit, the power generating unit generating power by photoelectric conversion;
    a communication unit to transmit and receive data to and from the IC card; and
    a control unit to stop supply of light by the light emitting unit responsive to the communication unit communicating with the IC card by the communication unit and to stop data communication to the IC card by the communication unit responsive to the light emitting unit supplying light to the IC card.

2. The information processing device according to claim 1, wherein when communication with the IC card ends, the control unit is configured to start supply of light by the light emitting unit after stopping signal transmission from the communication unit.

3. The information processing device according to claim 2, wherein the control unit is configured to restart communication by the communication unit after lapse of a predetermined waiting time from start or stop of supply of light by the light emitting unit.

4. The information processing device according to claim 1, further comprising:
    an imaging unit configured to image display contents displayed on the IC card; and
    an image processing unit to determine whether the data recorded on the IC card is captured into the display unit of the IC card or not based on an image imaged by the imaging unit,
    wherein the control unit is configured to restart communication by the communication unit when the image processing unit determines that the data is captured into the display unit of the IC card after starting supply of light by the light emitting unit.

5. The information processing device according to claim 1, further comprising:
    an IC card holding unit to hold the IC card at a position where light can be supplied from the light emitting unit to the power generating unit of the IC card and the display unit of the IC card is visible from outside.

6. The information processing device according to claim 1, further comprising:
    an imaging unit configured to image display contents displayed on the IC card; and
    an image processing unit to determine whether writing of the data to the IC card succeeds or not by verifying an image imaged by the imaging unit against the data recorded on the IC card.

7. A communication control method in an information processing device including a light emitting unit to supply light to a power generating unit mounted on an IC card that includes a display unit, the power generating unit generating power by photoelectric conversion, and a communication unit to transmit and receive data to and from the IC card, the method comprising:
    stopping supply of light to the IC card by the light emitting unit;
    performing, by the communication unit, data communication with the IC card after stopping the supply of light to the IC card;
    stopping the data communication by the communication unit; and
    starting supply of light by the light emitting unit after stopping the data communication to the IC card.

8. A non-transitory computer-readable medium storing a program causing a computer controlling an information processing device, including a light emitting unit, to supply light to a power generating unit mounted on an IC card that includes a display unit, the power generating unit generating power by photoelectric conversion, to perform steps comprising:
    transmitting and receiving, by a communication unit, data to and from the IC card; and
    stopping supply of light by the light emitting unit responsive to the communication unit communicating with the IC card by the communication unit and stopping data communication to the IC card by the communication unit responsive to the light emitting unit supplying light to the IC card.

* * * * *